UNITED STATES PATENT OFFICE 2,546,946

MODIFIED PHENOL-FORMALDEHYDE RESINS

Howard D. Hartough, Pitman, and John W. Schick, Camden, N. J., assignors to Socony-Vacuum Oil Company, Incorporated, a corporation of New York No Drawing. Application September 4, 1947, Serial No. 772,212

10 Claims. (Cl. 260—53)

The present invention relates to resins of the phenol-formaldehyde type and, more particularly, to nitrogenous resins of the phenol-formaldehyde type.

The condensation of phenol and formaldehyde in the presence of catalytic amounts of ammonium chloride has been described in U. S. Patent No. 965,823 (1910); in the Journal of the Society of the Chemical Industry, 28, 803 (1909); in French Patent No. 491,264 (1918); in Chemical Abstracts, 15, 3550 (1921); in French Patent No. 607,655 (1925); in U. S. Patent No. 1,975,884 (1934) and in Chemical Abstracts, 28, 7563 (1934). In each of the foregoing descriptions the use of ammonium chloride in catalytic amounts of the order of less than 0.25 mole, say 0.05 mole, is reported. It has now been discovered that the use of ammonium halide in greater than catalytic amounts produces an entirely different and novel type of product. The resinous bodies so produced are in thermoplastic form or thermosetting form immediately after preparation dependent to a very great extent upon whether or not the reaction was carried out in the presence or absence of a modifier. However, resins in the thermoplastic form are converted to thermosetting form at 150 degrees centigrade at 4000 pounds per square inch.

The products in the unset state are emulsifiable and are useful in the crush-proofing of cloth as disclosed in copending application for United States Letters Patent Serial No. 772,214 filed September 4, 1947, in the names of John W. Schick and Howard D. Hartough.

Suitable reactants are phenol, alkyl phenols, such as cresols, tertiary butyl phenol, tertiary amyl phenol, etc., polyhydric phenols such as resorcinol, hydroquinone, pyrogallol, wood tar distillate, etc., and polycyclic phenols such as the naphthols. Ammonium chloride, ammonium bromide and ammonium iodide, i. e. the ammonium halides as shown in application, Serial No. 636,511 filed December 21, 1945, now abandoned, may be used although for economy ammonium chloride is preferred.

Illustrative of method and the products produced are the following non-limiting examples.

Example I

About 94 parts by weight of phenol (about 1 mole), about 54 parts by weight of ammonium chloride (about 1 mole), and about 104 parts by weight of sodium bisulfite (about 1 mole) were mixed. About 243 parts by weight of an aqueous 36 per cent formaldehyde solution (about 3 moles) were added to the aforesaid mixture. A heat of reaction set in and the temperature rose to about 48 degrees centigrade before subsiding. The reaction mixture was then heated to 80–90 degrees centigrade for about six and one-half hours and cooled. The plastic, light yellow, resinous material insoluble in water was then separated. The resinous material was water-washed to remove residual salts and dried in a vacuum. The dried resin contained 4.43 per cent nitrogen, was a light yellow color and could be readily ground to a powder. This resin thermoset at 110 to 125 degrees centigrade on a hot plate without the addition of further formaldehyde or hexamethylene-tetramine. The required setting time was about 5 seconds.

Example II

About 470 parts by weight of phenol (about 5 moles), about 270 parts by weight of ammonium chloride (about 5 moles) and about 520 parts by weight of sodium bisulfite (about 5 moles) were mixed. To the mixture about 1620 parts by weight of an aqueous 36 per cent formaldehyde solution (about 20 moles; an excess) were added. The reaction mixture was heated at reflux (79 to 81 degrees centigrade) for seven hours, after which the aqueous layer was decanted and the rubbery, light yellow, resinous material was removed from the reaction vessel. The nitrogen content of this product was 3.14 per cent.

Example III

The reaction described in the previous example was repeated with the following modification, the amount of ammonium chloride was halved, i. e. only about 2.5 moles were used for 5 moles of phenol. The resultant product was pure white, plastic, putty-like thermoplastic material having no tackiness whatever. The nitrogen content of this material was 3.29 per cent.

Example IV

About 84 parts by weight of phenol (about 0.9 mole) and about 54 parts by weight of ammonium chloride (about 1 mole) were mixed. To this mixture about 246 parts by weight of an aqueous 36 per cent formaldehyde solution were added. No heat of reaction was noted. The reaction mixture was refluxed at about 87 to 89 degrees centigrade for about one hour. A brilliant yellow, semi-crystalline product separated. The reaction was stopped and the resin separated. A portion was digested for about an hour with hot water, cooled, filtered and dried in a vacuum. The nitrogen content of this product was 4.47 per cent.

The products obtained as described in Examples I to IV (both inclusive) do not discolor on standing, in distinct contrast to the products produced in the presence of catalytic amounts of ammonium chloride. The products produced in the presence of catalytic amounts of ammonium chloride are viscous, tacky oils of pink to red coloration which, upon contact with air, turn dark red.

Several other phenols were reacted with ammonium chloride in the presence and absence of modifiers. The results of these operations are reported in tabular form as follows:

| 1 Mole Reactant | Mole Ratio CH$_2$O | NH$_4$Cl | NaHSO$_3$ | SO$_2$ | Temp., °C. | Time of Reaction | Color and Type Resin | Emulsification |
|---|---|---|---|---|---|---|---|---|
| phenol | 2 | 1 | | stream of gas | 35 | 1½ hrs | lt. yellow | |
| p-cresol | 3 | 1 | 0.5 | | 84 | 4 hrs | yellow | slight. |
| Do | 2 | 1 | | | 80–88 | 1½ hrs | do | none. |
| Do | 2 | 1 | | stream of gas | 35 | 2 hrs | lt. yellow | slight. |
| p-t-amylphenol | 2 | 1 | | | 84–95 | 3½ hrs | do | very slight. |
| Do | 3 | 1 | 0.5 | | 78–84 | 5 hrs | do | slight. |
| Do | 2 | 1 | | stream of gas | 48–58 | 4¾ hrs | do | none. |
| resorcinol | 2 | 1 | | | 40–45 | 15 min | white, taffylike | soluble. |
| Do | 3 | 1 | 0.5 | | 35–43 | do | white, brittle | none. |
| Do | 2 | 1 | | stream of gas | | instant | salmon, brittle | Do. |
| alpha-naphthol | 2 | 1 | | | 51–58 | 5 min | tan, brittle | Do. |
| Do | 3 | 1 | 0.5 | | 52–58 | 7 min | do | Do. |

It has also been determined that the modifiers sodium bisulfite and sulfur dioxide belong to the novel class of modifiers defined as acids having an ionization constant above $1 \times 10^{-5}$ and including phosphoric acid, acetic acid, sulfurous acid (as SO$_2$ or as MHSO$_3$), benzoic acid, haloalkanoic acids, citric acid, formic acid, fumaric acid, maleic acid, etc. That is to say, nitrogenous phenolic resins containing at least 3 per cent of nitrogen can be obtained by reacting a phenol, i. e., monocyclic or polycyclic, monohydroxy or polyhydroxy, and alkylated or unalkylated, with aqueous formaldehyde and ammonium halide in the presence of acids having an ionization constant above $1 \times 10^{-5}$.

The dissociation constants of the foregoing acids are given on pages 1396 and 1397 of Lange's Handbook of Chemistry (5th ed., 1944) as follows:

| | K |
|---|---|
| Acetic acid | $1.86 \times 10^{-5}$ |
| Benzoic acid | $6.6 \times 10^{-5}$ |
| Citric acid | $8 \times 10^{-4}$ |
| Formic acid | $2.14 \times 10^{-4}$ |
| Fumaric acid | $1 \times 10^{-3}$ / $3 \times 10^{-5}$ (2H) |
| Maleic acid | $1.5 \times 10^{-2}$ / $2.6 \times 10^{-7}$ (2H) |
| Phosphoric acid | $1.1 \times 10^{-2}$ / $2 \times 10^{-7}$ (2H) / $3.6 \times 10^{-13}$ (3H) |
| Sulfurous | $1.7 \times 10^{-2}$ / $5 \times 10^{-}$ (2H) |
| Haloalkanoic Acids: | |
| Bromopropionic (alpha) | $1.08 \times 10^{-3}$ |
| Bromopropionic (beta) | $9.8 \times 10^{-5}$ |
| Chloroacetic | $1.55 \times 10^{-3}$ |
| Chloropropionic (alpha) | $1.47 \times 10^{-3}$ |
| Chloropropionic (beta) | $8.59 \times 10^{-5}$ |

It will be noted that the highest value for "K" in the foregoing tabulation is that for sulfurous acid, to wit, $1.7 \times 10^{-2}$.

We claim:

1. A method of making a nitrogenous phenolic resin, comprising reacting a phenol devoid of reactive acidic and basic substituents and having at least one active nuclear hydrogen and formaldehyde, the ratio of formaldehyde to phenol being at least 3 moles to 1 mole, in the presence of more than 0.25 mole of an ammonium halide selected from the group, consisting of ammonium chloride, ammonium bromide and ammonium iodide per mole of phenol and in the presence of at least 0.5 mole of an alkali metal sulfite.

2. A method of making a nitrogenous phenolic resin, comprising reacting a phenol devoid of reactive acidic and basic substituents and having at least one active nuclear hydrogen and formaldehyde in the ratio of 1 mole of phenol to 2 to 4 moles of formaldehyde in the presence of at least one mole of an ammonium halide selected from the group consisting of ammonium chloride, ammonium bromide and ammonium iodide and in the presence of at least 0.5 mole of a modifier selected from the group consisting of free acids having an ionization constant above $1 \times 10^{-5}$ but not greater than $1.7 \times 10^{-2}$ and alkali metal acid sulfites.

3. A method of making a nitrogenous phenolic resin, comprising reacting (A) a phenol devoid of reactive acidic and basic substituents and having at least one active nuclear hydrogen, (B) formaldehyde and (C) an ammonium halide selected from the group consisting of ammonium chloride, ammonium bromide and ammonium iodide in the mole ratio of A:B:C=1:2 to 4:0.5 to 1 and in the presence of at least 0.5 mole of a modifier selected from the group consisting of free acids having an ionization constant above $1 \times 10^{-5}$ but not greater than $1.7 \times 10^{-2}$ and alkali metal acid sulfites.

4. A method of making a nitrogenous phenolic resin, comprising condensing a phenol devoid of reactive acidic and basic substituents and having at least one active nuclear hydrogen, more than 1 mole of formaldehyde per mole of phenol and more than 0.25 mole of an ammonium halide selected from the group consisting of ammonium chloride, ammonium bromide and ammonium iodide in the presence of at least 0.5 mole per mole of phenol of a modifier selected from the group consisting of free acids having an ionization constant above $1 \times 10^{-5}$ but not greater than $1.7 \times 10^{-2}$ and alkali metal acid sulfites.

5. A method of making a nitrogenous phenolic resin, comprising condensing phenol and formaldehyde in the ratio of 1 mole to at least 3 moles in the presence of at least 0.25 mole of ammonium chloride per mole of phenol and in the presence of at least 0.5 mole of a modifier selected from the group consisting of free acids having an ionization constant above $1 \times 10^{-5}$ but not greater than $1.7 \times 10^{-2}$ and alkali metal acid sulfites.

6. A method of making a nitrogenous phenolic resin, comprising condensing an alkyl phenol devoid of reactive acidic and basic substituents and having at least one active nuclear hydrogen and formaldehyde in excess of molal ratio in the presence of at least 0.25 mole of ammonium chloride per mole of said phenol and in the presence of at least 0.5 mole of a modifier selected from the group consisting of free acids having an ionization constant above $1 \times 10^{-5}$ but not greater than $1.7 \times 10^{-2}$ and alkali metal acid sulfites.

7. A method of making a nitrogenous phenolic resin, comprising condensing a polyhydric phenol devoid of acidic and basic substituents and having at least one active nuclear hydrogen and more than a molal equivalent of formaldehyde in the presence of at least 0.25 mole of ammonium chloride per mole of said phenol and in the presence of at least 0.5 mole of a modifier selected from the group consisting of free acids having an ionization constant above $1 \times 10^{-5}$ but not greater than $1.7 \times 10^{-2}$ and alkali metal acid sulfites.

8. A method of making a nitrogenous phenolic resin which comprises reacting (A) a phenol devoid of reactive acidic and basic substituents and having at least one active nuclear hydrogen, (B) formaldehyde and (C) an ammonium halide selected from the group consisting of ammonium chloride, ammonium bromide and ammonium iodide in the mole ratio of A:B:C=1:2 to 4:more than 0.25 whilst passing sulfur dioxide through the aforesaid mixture.

9. A method of making a nitrogenous phenolic resin which comprises reacting (A) a phenol devoid of reactive acid and basic substituents and having at least one active nuclear hydrogen, (B) formaldehyde, (C) an ammonium halide selected from the group consisting of ammonium chloride, ammonium bromide and ammonium iodide and (D) sodium acid sulfite in the mole ratio of A:B:C:D=1:2 to 4:more than 0.25:at least 0.5.

10. A thermosetting phenolic resin containing nitrogen in the proportion of one atom of nitrogen to at least three phenol radicals and containing at least three per cent by weight of nitrogen, said resin having been obtained by condensing a phenol devoid of reactive acid and basic substituents and having at least one active nuclear hydrogen with formaldehyde in the molal ratio of 1:2 to 4 in the presence of at least 0.25 mole of an ammonium halide selected from the group consisting of ammonium chloride, ammonium bromide and ammonium iodide and in the presence of at least 0.5 mole of a modifier selected from the group consisting of free acids having an ionization constant above $1 \times 10^{-5}$ but not greater than $1.7 \times 10^{-2}$ and alkali metal acid sulfites.

HOWARD D. HARTOUGH.
JOHN W. SCHICK.

REFERENCES CITED

The following references are of record in the file of this patent:

UNITED STATES PATENTS

| Number | Name | Date |
|---|---|---|
| 1,955,731 | Bender | Apr. 24, 1934 |

FOREIGN PATENTS

| Number | Country | Date |
|---|---|---|
| 686,988 | Germany | Jan. 20, 1940 |

OTHER REFERENCES

Walker—Formaldehyde, pub. by Reinhold Pub. Co., N. Y. (1944), pp. 39 to 48.